US006442920B1

(12) United States Patent
Peterson et al.

(10) Patent No.: US 6,442,920 B1
(45) Date of Patent: Sep. 3, 2002

(54) MECHANICAL HARVESTER FOR TREE FRUITS

(75) Inventors: Donald L. Peterson; Scott D. Wolford, both of Martinsburg, WV (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 09/875,028

(22) Filed: Jun. 7, 2001

(51) Int. Cl.$^7$ .............................................. A01D 46/28
(52) U.S. Cl. ...................................................... 56/328.1
(58) Field of Search ............................ 56/327.1, 328.1, 56/340.1, 329, 330, 331, 340

(56) References Cited

U.S. PATENT DOCUMENTS

| | | | |
|---|---|---|---|
| 4,432,190 A | * 2/1984 | Orlando | 56/1 |
| 4,606,179 A | 8/1986 | Peterson | 56/329 |
| 4,860,529 A | 8/1989 | Peterson et al. | 56/330 |
| 5,170,614 A | * 12/1992 | Williamson et al. | 198/313 |
| 5,469,695 A | * 11/1995 | Zehavi et al. | 56/329 |
| 5,642,610 A | * 7/1997 | Dupon et al. | 56/330 |
| 5,816,037 A | 10/1998 | Chiel et al. | 56/340.1 |
| 5,946,896 A | 9/1999 | Daniels | 56/328.1 |

OTHER PUBLICATIONS

Peterson, D.L., et al., "A Systems Approach to Robotic Bulk Harvesting of Apples", *Transactions of the ASAE*, vol. 42(4), pp. 871–876, 1999.
Warner, G., "Stemless Cherries Make Mechanical Harvesting Possible", *Good Fruit Growers*, pp. 28–30, Aug., 2000.
Robinson, T.L., et al., "Mechanical Harvestbility of Y–Shaped and Pyramid–Shaped 'Empire' and 'Delicious' Apple Trees", *J. Amer. Soc. Hort. Sci.*, vol. 115(3), pp. 368–374, 1990.

* cited by examiner

*Primary Examiner*—Robert E. Pezzuto
(74) *Attorney, Agent, or Firm*—M. Howard Silverstein; John D. Fado; Janelle S. Graeter

(57) ABSTRACT

An apparatus for the mechanical harvesting of tree fruits has been designed which has the capability of providing fruit suitable for the fresh market. The harvester features an impactor for dislodging fruit from a tree limb, a unique positioning system, a collecting conveyor utilizing energy-absorbing materials for minimizing fruit damage due to the impact of falling fruit, a transport conveyor which moves the harvested fruit to a revolving collecting bin, and bin-filling mechanisms which gently deposit harvested fruit in the collecting bin.

12 Claims, 5 Drawing Sheets

MECHANICAL HARVESTER FOR TREE FRUITS

BACKGROUND OF THE INVENTION

1. Field of the Invention p This invention relates to an apparatus for the mechanical harvesting of tree fruits. The harvester features an impactor, which removes fruit from the tree limb, a unique system for impactor positioning, a collecting conveyor, an energy-absorbing collection device which catches the fruit as it falls from the tree, a transfer conveyor, which transports the fruit to a revolving bin for collection, and bin-filling mechanisms for the gentle deposit of both large and small fruit.

2. Description of the Related Art

There have been a number of approaches to the development of mechanical fruit harvesters. Shaking mechanisms (inertia shakers) have been utilized in "shake-catch" scenarios where a device is positioned against a tree trunk and a sufficient force is applied by oscillation or vibration to dislodge the fruits (Peterson, D., U.S. Pat. No. 4,606,179; Chiel and Zehavi, U.S. Pat. No. 5,816,037). In addition, shakers having a spiked-drum configuration have also been described. These mechanisms operate by oscillation of spikes which enter the tree canopy as the harvester moves along a row (Peterson and Kornecki, U.S. Pat. No. 4,860,529). A harvester having spiked oscillating heads has also been described (Daniels, U.S. Pat. No. 5,946,896). While these harvesters have achieved some success in limited applications, currently there are no commercial harvesters of tree fruits capable of harvesting fruit of fresh market quality. Inertia shakers used to effect fruit removal can cause considerable damage during detachment, and catching surfaces and fruit handling components are also not refined enough to handle fruit without damage.

SUMMARY OF THE INVENTION

We have designed a mechanical harvester for tree fruits for the fresh market which causes little to no damage to the harvested fruit.

Accordingly, it is an object of the invention to provide a harvester having novel components which, working together, effectively detach fruit from the tree limb and convey it to a collecting bin attached to the harvester with minimal to no damage to the fruit.

Other objects and advantages of the invention will become readily apparent from the following description.

DETAILED DESCRIPTION OF THE INVENTION

Harvesting of tree fruits is a serious problem for fruit growers due to the high cost of labor and the difficulty of finding workers at the appropriate time for harvesting. Mechanical harvesters have therefore become commonplace, however their success is limited largely to use with fruits intended for processing such as canning, preserving, etc. The successful harvest of fresh-market fruits has remained a challenge. The major obstacle to mechanical harvesting is excessive fruit damage. This damage occurs as a result of movement of the fruit during detachment by fruit-to-fruit and fruit-to-branch contact, fruit-to-branch contact when falling and fruit-to-fruit contact on the collecting surfaces of the harvesters. In addition, the impact of the fruit on these surfaces also results in substantial damage to the fruit. There has thus been an incentive to design a harvester which overcomes these problems by minimizing both fruit-to-fruit impact and fruit-to-surface impact.

The harvester of the invention (FIG. 1) is comprised of three basic elements: 1) an impactor which dislodges fruit from a tree limb, 2) means for catching and conveying the dislodged fruit and 3) means for collecting the harvested fruit, i.e. a collecting bin which may be equipped with an automated bin filler selected according to the particular size of harvested fruit. These elements include several components which work together to detach, catch and transport fruit from tree limbs to the collecting bin in such a manner that damage to the fruit is minimized. It is most efficient with trees having main scaffold branches trained in a fairly uniform inclined orientation or trained to either a "V"- or "Y"-shaped trellis. The components of the harvester are mounted on a ground-traversing carriage with a steerable front wheel. It is self-propelled, with a driver positioned at the rear who controls all operations. The driver positions the harvester along a tree-row and stops at each tree for harvesting.

Figure 2:
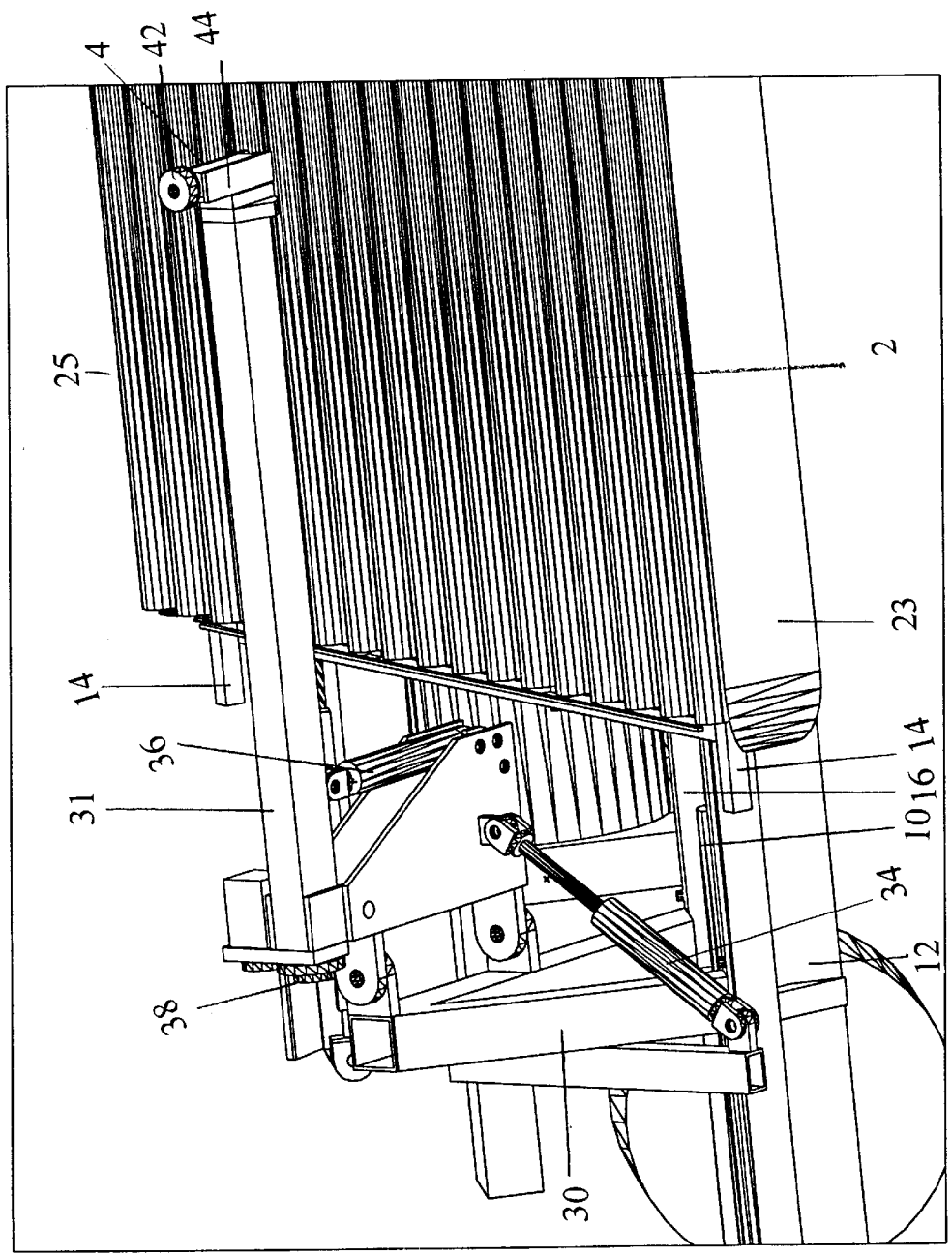
FIG. 2 is a perspective view of the impact positioning mechanism and collecting conveyor.
Figure 3:
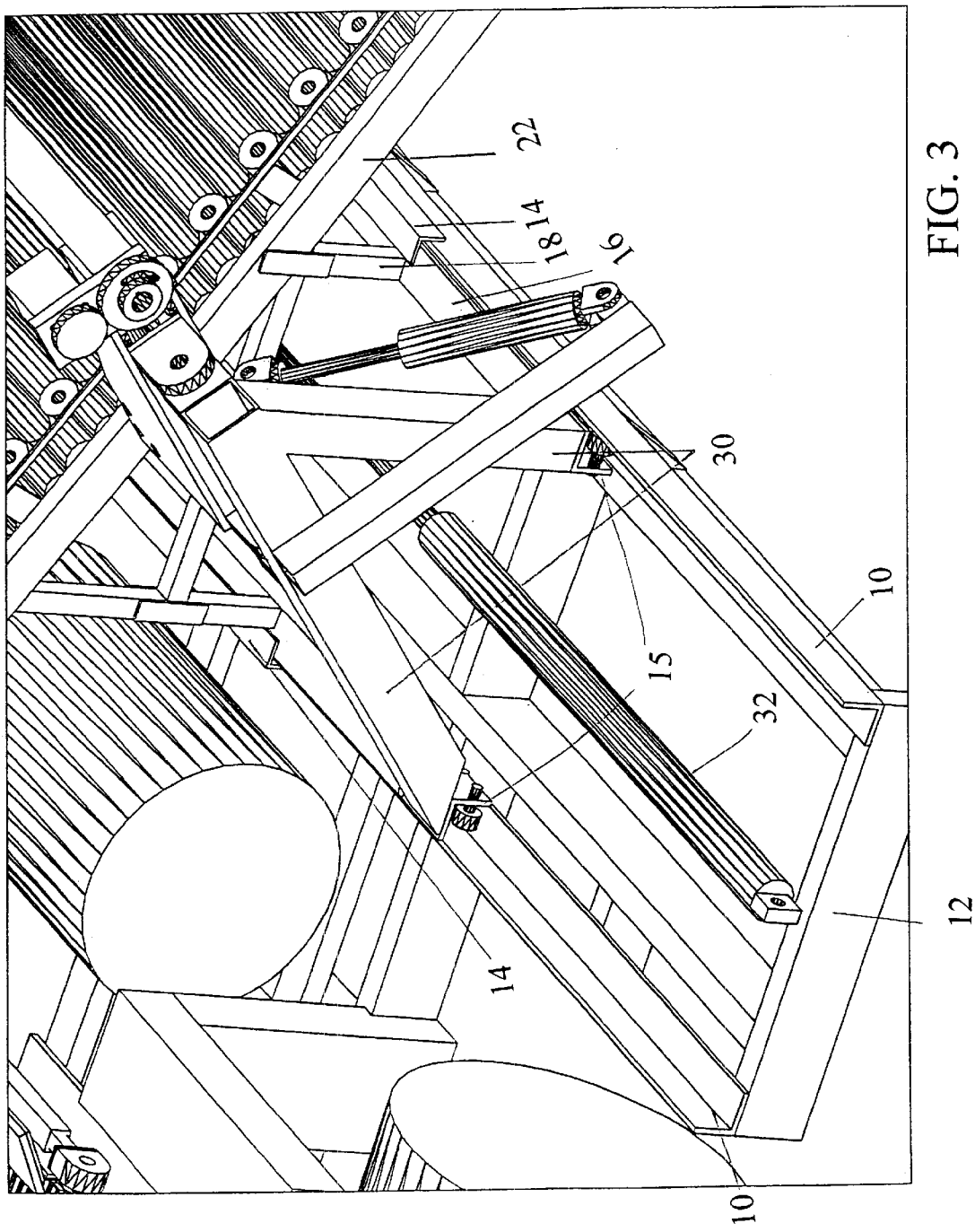
FIG. 3 is a detailed perspective view showing the inter-relationship between the impact positioning mechanism and the collecting conveyor on the carriage track.

Fruit is removed from the tree by means of the impactor, also referred to in the art as a rapid displacement actuator or RDA (Peterson et al. 1999. *Transactions of the ASAE*. vol. 42, no. 4, pp. 871–876, herein incorporated by reference) mounted at one end of an arm (FIG. 2). The harvester is positioned so that the impactor can engage a fruit-bearing tree limb at an approximately 90° angle. Placement of the impactor is controlled by an impact positioning mechanism which is also structurally connected to a catching surface (collecting conveyor) in order to ensure that fruit dislodged from the tree by the impactor falls directly onto the collecting area (FIG. 3). The interconnected impact positioning mechanism and collecting conveyor are mounted on a track so that they can be positioned simultaneously by the driver. To effectively position the impactor, first the driver positions the harvester so that the impactor and collecting conveyor are positioned directly underneath the tree canopy. Second, the driver slides the interconnected impactor and collecting conveyor into place along the track. Third, the arm having the impactor at one end is manipulated to place the impactor against the tree limb. The arm can move up, down, backward, forward and twist and may be controlled by the driver using joysticks. In addition, a second harvester which is a mirror image of the first harvester and positioned on the opposite side of the tree row may be utilized to collect any fruit which falls from the tree away from the catching surface of the first harvester or bounces off its catching surface.

Fruit is detached from the tree limb by action of the impactor against the limb. The arm is moved to firmly press the impactor against the limb until sufficient pressure or force is achieved to engage a microswitch mounted on a hydraulic cylinder which activates the impactor. The pressure triggers a quick jolting action which is hydraulically controlled, causing the fruit to fall from the limb. A pressurized accumulator supplies fluid to the hydraulic cylinder and impactor to generate the necessary limb acceleration and displacement to effect fruit removal. Activation of the impactor may be repeated in order to effectively harvest as much fruit as possible. A simple electric circuit controls activation, and, by adjusting a time delay relay, the impactor can be activated for either single or multiple impacts. In addition, if the tree limb is too small or too resilient to provide sufficient resistance to achieve the force necessary to activate the jolting action of the impactor, the driver can activate it by any convenient means such as a foot pedal or button mounted on the joystick.

After detachment from the tree limb, fruit falls to the catching surface (or collecting conveyor), which is part of a conveyor system for moving the fruit to its ultimate destination, the collecting bin at the rear of the harvester. Since the objective is to harvest fruit with little or no damage, the collecting conveyor is designed to minimize the impact of falling fruit. The conveyor is comprised of a series of supports and a catching surface. The catching surface is a flexible material capable of absorbing energy generated by the fruit as it falls. The supports may be pipes, rollers or slats. Preferably, the supports are spaced apart such that pockets or troughs are formed by the flexible material between each individual pipe. As the conveyor travels around its track, the fruit naturally settles into the pockets, thus minimizing damage which might occur due to fruit-to-fruit contact. The individual supports may also be covered with energy-absorbing material, thus providing additional cushioning for the fruit. Materials effective for the stated purpose are well-known and include, but are not limited to, foam, mesh, felt or pipe insulation.

Preferably, the collecting conveyor is mounted at an upward incline toward the second conveyor means of the system, a transfer conveyor, and is positioned such that its outlet edge is slightly above the transfer conveyor. As the collecting conveyor rotates around its upper edge, the flexible material stretches such that the pocket holding the fruit flattens out, and the fruit falls to the transfer conveyor (see FIG. 4). A cushioned transfer incline may be placed underneath the collecting conveyor to provide additional cushioning for the fruit and to guide the fruit onto the transfer conveyor. The transfer conveyor is preferably a flexible open mesh belt which allows air to be pulled through it for trash removal.

Figure 1:
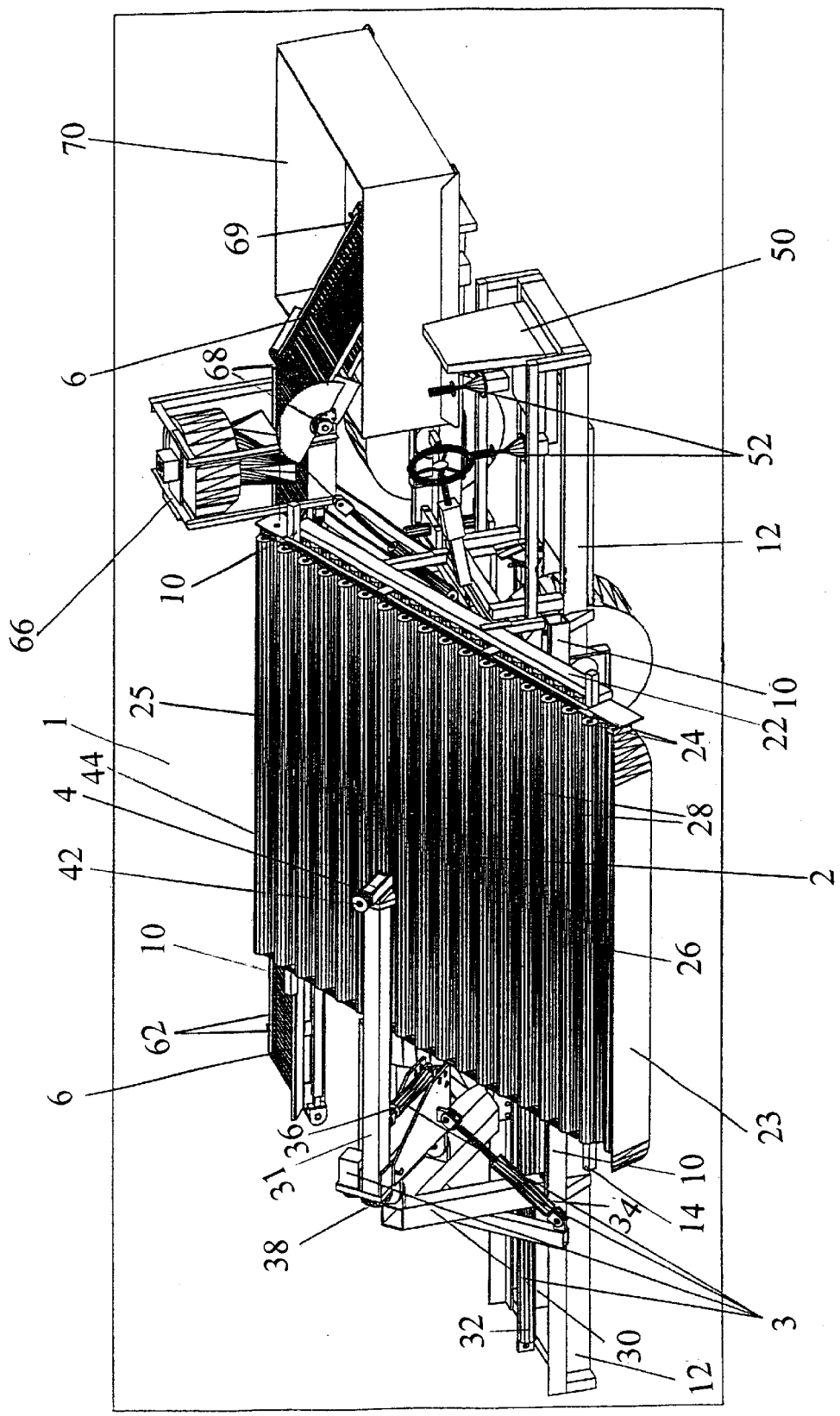
FIG. 1 is a perspective view of the harvester with the automated bin filler for small fruits such as cherries.

The transfer conveyor moves on a track perpendicular to the collecting conveyor toward a collecting bin which is preferably mounted at the rear of the harvester (see FIG. 1). The transfer conveyor is optionally fitted with a device mounted on the sides of the frame and spanning the width of the collecting conveyor which provides support to fruit as it falls from the collecting conveyor to the transfer conveyor. The device may be a brush having soft fiber bristles which extend toward the collecting conveyor, flaps, strands or strings of flexible material which rest against the transfer incline and provide support to the moving fruit sufficient to slow the movement of the fruit but not to impede its movement onto and along the transfer conveyor. This feature is especially beneficial for larger fruits such as apples and pears. In addition, a fan may also be mounted on the sides of the track (FIG. 1) and positioned above the transfer conveyor, preferably at the outlet end immediately before the fruit is discharged into the collecting bin. The fan removes debris which may have accumulated during the harvesting process.

The collecting bin is preferably positioned at the rear of the harvester and rotates so that fruit accumulates evenly in the bin as it is deposited from the transfer conveyor. In addition, in order to minimize the distance between the outlet end of the transfer conveyor and the collecting bin, thus preventing damage due to fruit tumbling into the bin, the transfer conveyor is initially adjusted so that it declines steeply into the bin to deposit harvested fruit. The conveyor end is equipped with a sensor which raises the level of the outlet end of the conveyor as the bin fills with fruit. The position of the outlet end of the transfer conveyor is thus continuously maintained slightly above the level of the fruit.

Figure 5:
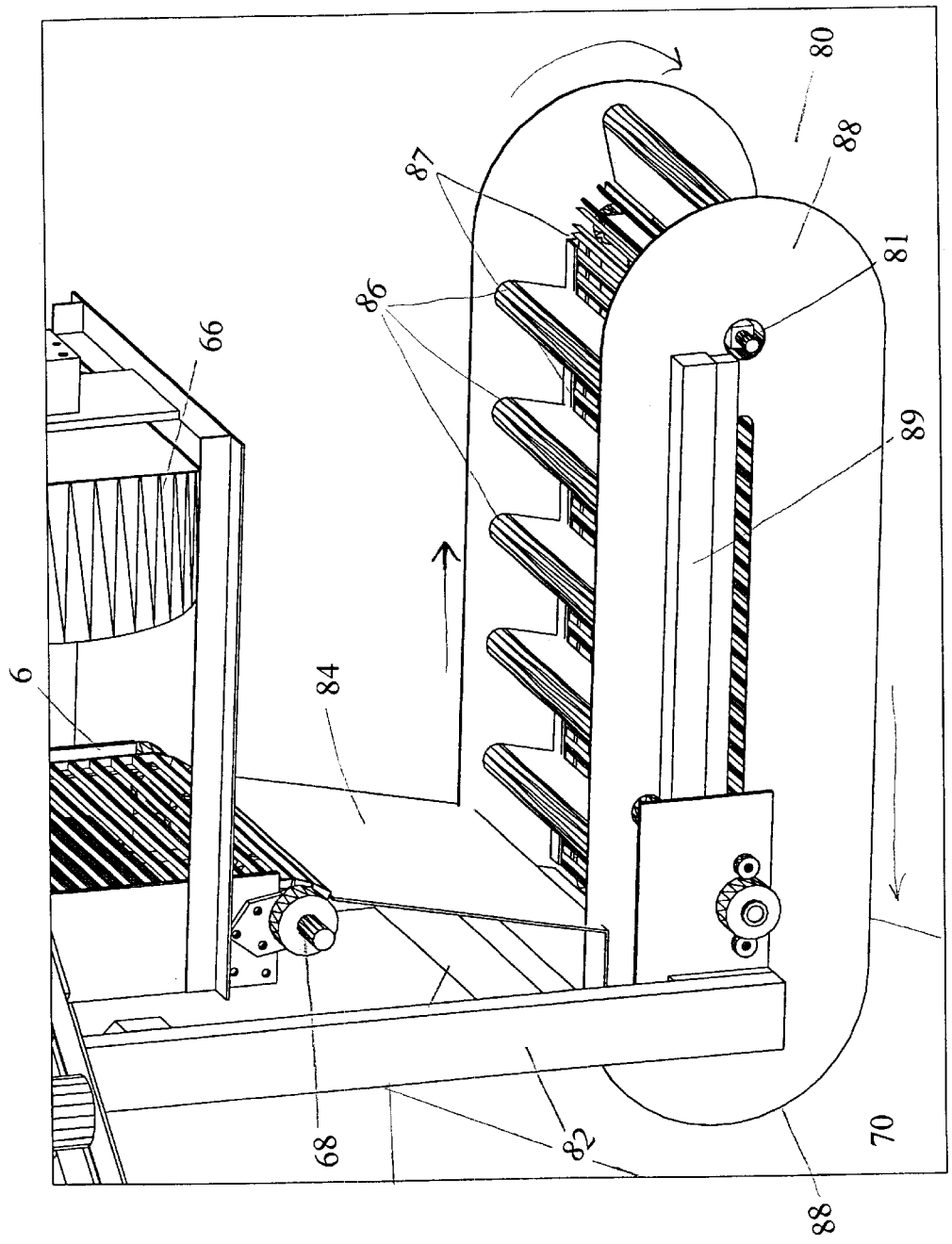
FIG. 5 is a detailed top view of the filler which is positioned between the transfer conveyor and the collecting bin for large fruits such as apples.

The harvester is effective for the harvest of any tree fruits, including but not limited to, apples, pears, citrus, cherries, apricots, peaches, plums and nectarines. While the harvester as described is effective for any tree fruits, some adjustments or modifications may be made to accomodate the larger fruits such as apples and pears. The space between the supports may be increased to create deeper pockets, thus allowing larger fruits to settle more deeply into the pockets. In addition, a unique bin-filling mechanism, or filler, may be utilized at the outlet end of the transfer conveyor to deposit fruit in the collecting bin (see FIG. 5). The filler is a vertical conveyor comprising flights which rotate around a track. A ramp attached to the outlet end of the conveyor feeds the fruit to the flights which proceed up, over the filler, then down into the bin to gently deposit the fruit. The filler is equipped with a sensor which raises the level of the mechanism by means of a parallel pair of racks with pinions in a common shaft.

Figure 4:
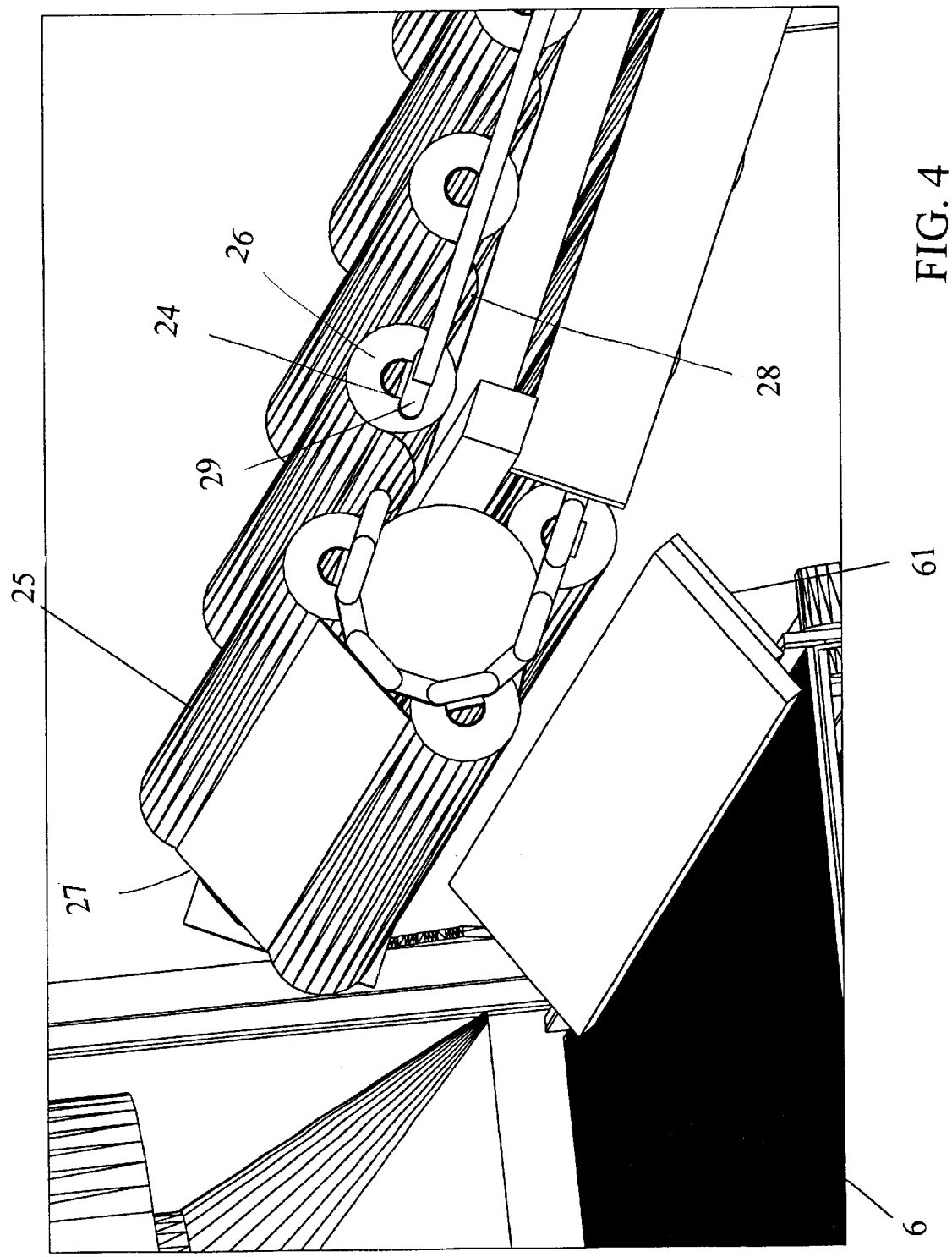
FIG. 4 is a detailed view of the interface between the collecting conveyor and the transfer conveyor.

With reference to the figures, harvester 1 is shown in FIG. 1. On the tree side of harvester 1, catching surface or collecting conveyor 2 is supported by frame 22. Energy-absorbing flexible material 26 overlaid over equally-spaced pipes 24 comprise the conveyor which is overlaid with flexible sheet material 27, FIG. 4, forming pockets 28 between pipes 24 to provide spaces for the harvested fruit to settle while moving to transfer conveyor 6. Energy-absorbing material 26 also covers pipes 24 individually (FIG. 4). Pipes 24 are supported by extended attachment link 29 on conveyor chain (FIG. 4). Collecting conveyor 2 inclines upward from left to right. Strip 23 is rigidly connected to frame 22 at the downward edge of the incline to prevent fruit from falling to the ground. Frame 22 is mounted on support 16 at 18 (FIGS. 2 and 3). Impactor positioning mechanism 3 is mounted on support 16 by supports 30, which are also connected to frame 22 at 16, 18 (FIG. 3), thus providing the capability of simultaneous lateral positioning of impactor 4 and collecting conveyor 2. Support 16 rides on cam followers 15 in track 10 (FIG. 3). Track 10 is supported by main harvester frame 12. Support 16 thus provides a means of interconnecting positioning mechanisms 3 and collecting conveyor 2 to ensure that the collecting surface is directly underneath the impactor and that fruit dislodged by the action of impactor 4 is effectively collected by harvester 1 (FIGS. 2 and 3). Member 14, attached to track 10, restricts vertical movement of support 16 (FIG. 3). Impactor 4 is mounted on arm 31 and is positioned by positioning mechanisms 32 (forward and backward), 34 (side to side), 36 (up and down), 38 (swivel) (FIGS. 1 and 2). Rubber disc 42 of impactor 4 is placed against a fruit-bearing tree limb and activated by hydraulic cylinder 44.

The driver is seated at the rear of harvester 1 at operator position 50. Manipulation of positioning mechanisms 3 is achieved by operating joysticks 52.

Transfer conveyor 6 is supported by frame 62 and is a flexible open mesh belt (FIG. 1). Fan 66 is mounted on frame 62 at the rear of the conveyor. Pivot point 68 allows transfer conveyor 6 to decline into collecting bin 70 to deposit harvested fruit. This decline is covered by a flexible sheet (not shown) to prevent fruit from accelerating too fast down the decline. Sensor 69 is mounted on frame 62 such that the level of fruit in bin 70 is detectable and the end of transfer conveyor 6 is raised as the fruit level increases. Transfer incline 61 (FIG. 4) is mounted on frame 62 and declines from collecting conveyor 2 above toward transfer conveyor 6 below and is covered with energy-absorbing material.

Filler 80 (FIG. 5) is mounted on frame 82 and connected to transfer conveyor 6 by ramp 84 which is connected to frame 82. Flights 86 are covered by energy-absorbing material, are attached to filler belt 87 and accept harvested fruit from transfer conveyor 6 via ramp 84. Flights 86 rotate around track 88 as indicated by arrows to deposit fruit in bin 70. Rotation of lights 86 is driven by a motor (not shown) attached at shaft 81. sensor (not shown) is mounted at lower end of track 88 such that the level of fruit in bin 70 is detectable, and the filler is raised as the fruit level increases. Filler 80 is raised and lowered by means of a pair of parallel racks 89 with pinions (not shown) in a common shaft.

Harvester 1 operates as follows: Driver seated at operator position 50 drives along a tree row and positions harvester 1 underneath a tree canopy. Collecting conveyor 2 and impactor 4 are positioned underneath a fruit-bearing tree limb requiring harvesting using joysticks 52 to move the components along track 10. Impactor 4 is positioned against the tree limb utilizing any or all of impactor positioning mechanisms 3, again using joysticks 52. Pressure of impactor disc 42 against the tree limb activates hydraulic cylinder 44 to deliver at least 1 and possibly multiple jolts of the limb, thereby dislodging fruit which falls to collecting conveyor 2. As the conveyor rotates around frame 22, the fruit settles into pockets 28 between pipes 24. As the fruit reaches edge 25 of collecting conveyor 2, flexible material 27 stretches out between pipes 24, thus eliminating pockets 28 and allowing the fruit to roll onto transfer conveyor 6. Transfer incline 61 provides support and guides the fruit onto the surface of transfer conveyor 6. The fruit is conveyed toward collecting bin 70. At the end of transfer conveyor 6, debris is removed from the harvested fruit by fan 66. The fruit is deposited into collecting bin 70.

It is understood that the above embodiments are described by way of example, and that modifications in configuration of the components is within the scope of the invention. For example, the collecting bin may be placed at the front of the harvester instead of the rear, with the transfer conveyor moving in the direction opposite to that described. In addition, two impactor-collecting conveyor combinations may be attached to the carriage, each declining from the center of the harvester where the transfer conveyor is mounted to accept harvested fruit from both sides. This configuration would enable harvesting two trees from a single position.

We claim:

1. An apparatus for harvesting tree fruits, said apparatus comprising a steerable, self-propelled carriage having mounted thereon a) an impactor for dislodging fruit from a fruit-bearing tree limb mounted on a positioning arm, wherein said arm moves up, down, forward, backward and twists;

b) a collecting conveyor for catching and conveying the dislodged fruit, wherein said conveyor is supported by a frame and is comprised of a series of supports covered by a catching surface having an energy-absorbing flexible material, and wherein said collecting conveyor and said positioning arm are connected and mounted on a track on said carriage such that both components are positioned simultaneously for harvesting fruit;

c) a transfer conveyor, wherein said transfer conveyor is supported by a frame and said collecting conveyor has an outlet edge disposed such that it is positioned above said transfer conveyor sufficient to allow the deposit of harvested fruit onto said transfer conveyor; and d) a collecting bin, wherein said transfer conveyor has an outlet end which declines into said bin for the deposit of harvested fruit.

2. The apparatus of claim 1, wherein the supports of said collecting conveyor are spaced apart such that pockets are formed between each support.

3. The apparatus of claim 1 or 2, wherein said supports are individually covered with energy-absorbing material.

4. The apparatus of claim 1, wherein said positioning arm is operated by joysticks.

5. The apparatus of claim 1, wherein said collecting conveyor is mounted on said carriage at an upward incline toward said transfer conveyor and a strip is rigidly connected to said collecting conveyor frame at the downward edge of the collecting conveyor.

6. The apparatus of claim 1, wherein a transfer incline is positioned underneath the upward edge of said collecting conveyor, slanting downward from the outlet edge of the collecting conveyor to the transfer conveyor.

7. The apparatus of claim 1, wherein said transfer conveyor moves on a track mounted perpendicular to said collecting conveyor and moves toward a collecting bin mounted on said carriage.

8. The apparatus of claim 7, wherein a support device is mounted on the frame of the transfer conveyor which spans the width of said collecting conveyor, said support device comprising flexible material selected from the group consisting of fiber bristles, flaps, strands, and strings and wherein said flexible material is in sufficient contact with said transfer conveyor to slow movement of harvested fruit present on the conveyor but not impede its movement onto and along said conveyor.

9. The apparatus of claim 1, wherein a fan is mounted on the transfer conveyor frame such that it is positioned above the transfer conveyor at the outlet end of said conveyor.

10. The apparatus of claim 1, wherein said collecting bin is mounted beneath the outlet end of said transfer conveyor and said conveyor declines downward into said bin.

11. The apparatus of claim 10, wherein said collecting bin revolves such that deposited fruit is equally distributed into said bin.

12. The apparatus of claim 10, wherein a sensor mounted on the outlet end of said transfer conveyor raises said outlet end as the level of fruit inside the collecting bin increases.

* * * * *